M. J. HUNT.
Grain-Drill.
No. 213. Reissued Mar 30, 1852
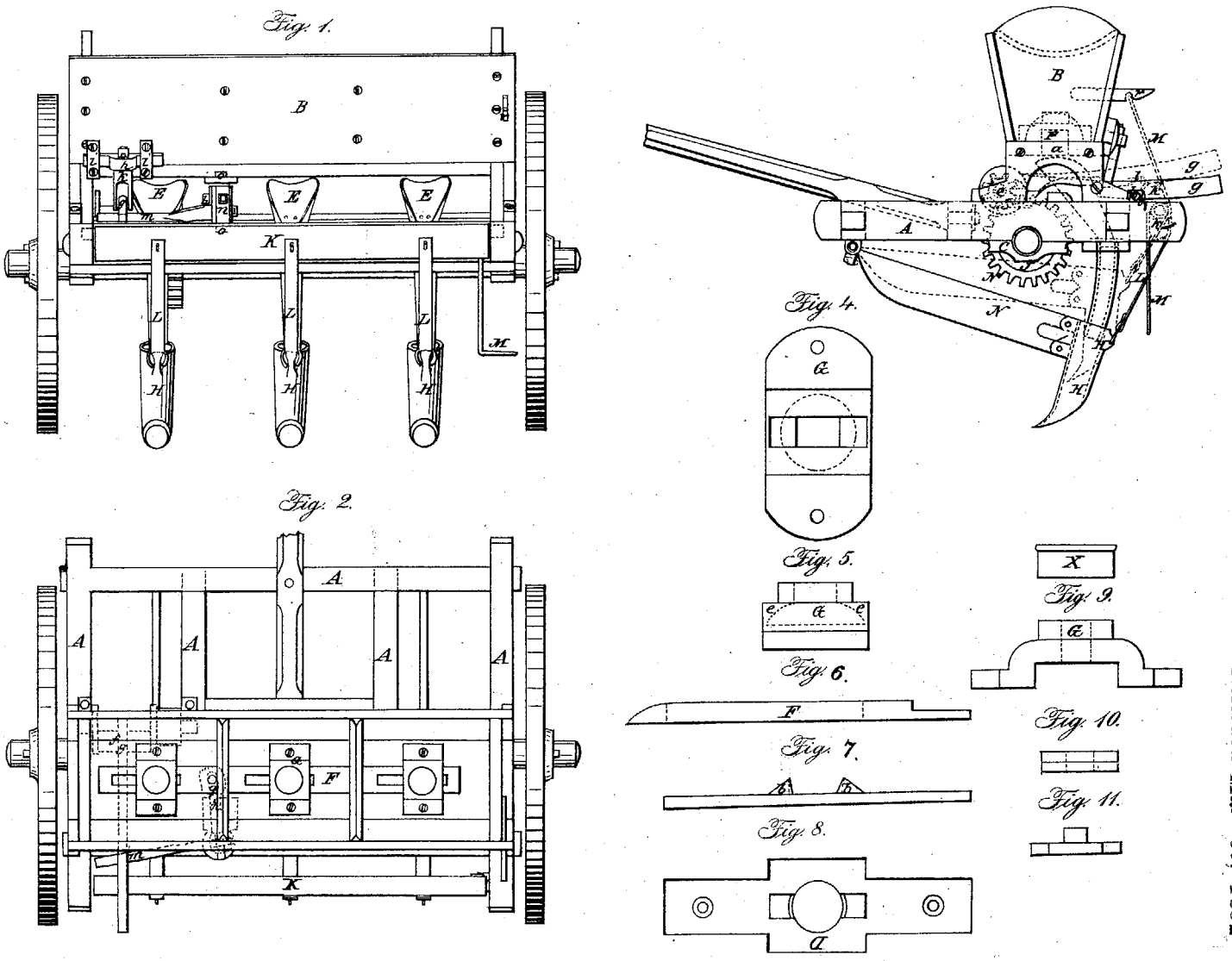
AM. PHOTO-LITHO. CO. N.Y. (OSBORNE'S PROCESS.)

UNITED STATES PATENT OFFICE.

MARSHALL J. HUNT, OF RISING SUN, MARYLAND.

IMPROVEMENT IN THE GEARING OF A SEED-PLANTER.

Specification forming part of Letters Patent No. 8,138, dated June 3, 1851; Reissue No. 213, dated March 30, 1852.

*To all whom it may concern:*

Be it known that I, MARSHALL J. HUNT, of Rising Sun, in the county of Cecil and State of Maryland, have invented a new and useful Improvement in Seed-Planters; and I do hereby declare the following to be a full, clear, and exact description thereof, reference being had to the accompanying drawings, making part of the same, in which—

Figure 1 represents the rear end of the planter; Fig. 2, a top view; Fig. 3, an end view with the wheels removed; Figs. 4, 5, 6, 7, 8, 9, 10, and 11, detailed drawings of the several pieces constituting the feeding apparatus, and which are represented as about the full size for a working-machine.

Similar letters in the several figures represent the same parts.

In the use of a reciprocating seeding-bar in the hopper of seed-planters, it has been found that upon side hills or rough ground the cells heretofore in use make irregular or bunch sowing, from the fact that the cells do not throw the same quantity on the uphill that they do on the downhill stroke of the bar. The communication also between the cells and the seeding-tube being intermittent, as the cells must return to the hopper to be charged after distributing the quantity first carried out, makes irregularity in the distribution of the seed. There is also another important defect in the operation of the cells—viz., that if on rough ground the wheels of the planter should strike against a stone or receive any sudden jar at the instant the communication between the seeding-bar and the tubes is made, the grain in the cell is immediately all thrown out, leaving it in one spot, which amounts to an almost entire loss of the grain.

The nature of my invention consists in substituting for the cells a long slot in the seeding-bar, which slides over a stationary plate in the bottom of the hopper, and which plate is provided with lugs projecting upward and placed immediately at the edge of the opening into the seed-tubes, so that the grain is forced over said lugs by the slotted bar, said lugs presenting a uniform resistance to the passing out of the grain, though at the same time allowing it to be forced out by the movement of the bar. This arrangement admits of distributing the same amount on the up as it does on the down stroke of the bar on side-long ground, and if on rough ground the machine should strike against a stone or receive any sudden jar, the stationary lug prevents the grain from being thrown from the machine irregularly. In a word, the communication between the hopper and the seed-tubes is always open; but the quantity to pass out depends entirely upon the motion of the seed-bar and the stationary lug.

Another feature of my invention consists in the manner of giving motion to the feeding apparatus and regulating or adjusting the quantity of seed to be sown.

To enable others skilled in the art to make and construct my machine, I shall proceed to describe the same with reference to the drawings.

On a frame, A, of common construction, which is secured to the axle by the boxes C, I arrange the seed-box B, made in the usual manner. In the bottom of said seed-box is a round hole, *a*, (shown by the dotted lines in Fig. 3,) and corresponding in size with the hole in the plate D, Fig. 8, through which the grain passes to the seed-tubes E, and which said tubes are open in the rear to enable the operator to see whether the machine is feeding regularly and in proper quantities.

On the bottom of the seed-box, and let into it flush by a mortise, I arrange the cast-iron plate D, secured firmly in place by screws. On this plate is cast the lugs *b b*, the sides of which next the grain-receiver may be either in a regular inclined plane or slightly convex, the opposite sides sloping slightly toward the opening in the bottom of the seed-box, for purposes to be hereinafter described.

On top of the plate D, I place the longitudinal slotted bar F, also made of cast-iron, either in one piece or in sections, and secured to each other by screws passing through half-laps in the ends of each section, the slot in said bar being just wide enough to span the lugs *b b* and move freely back and forth past the same, and of suitable length to form the sides and one end of the grain-receivers, the inclined sides of the lugs forming the fourth side, but not rising to the full height of the upper surface of said plate D. This prevents the grain from spilling out of the receiver when thrown into the seed-box, or when the seeder is turning at the ends of the rows, or when stationary, and entirely doing away with brushes or similar devices for holding the grain in the box when not sowing. The slotted bar, it has been found in practice, gives a more regular and continuous feed than the cells heretofore used in said bars, for the cells are intermittent in their communication with the seeding-tubes, while the slots are continuous. Besides, in the use of the cells on side hills, it is found that the uphill motion does not distribute the same amount of grain with the downhill motion, and consequently irregular or bunch planting is the result. With the long slots in the seeding-bar and the lugs on the bar below it, a continuous and more regular feed is had either on side hills or rough ground. On rough ground with the cells, if the planter should strike a stone, the moment the communication is opened between the seeding-bar and the tube the grain is immediately thrown out. By my arrangement the resistance to the grain from passing out is always the same.

Over the slotted bar F is placed the cap G, also of cast-iron, and through which said bar F slides freely when the machine is sowing. On the under side of said cap G is a concave recess, (shown by dotted lines at *c c*, Fig. 5,) which spans the lugs *b b*, leaving a space between the top of the lug and the concave for the grain to be forced out of the receiver, as the slotted bar F (forming part of the receiving-chamber) is moved back and forth. Through the top of this cap G there is a hole, over which is placed a tight tin cover, X, Fig. 9, and which can be easily removed in case the machine should become choked by straw or other material and be cleaned. The grain, being forced out of the receiver by the sliding of the slotted bar aforesaid, falls through the hole *a*, Fig. 3, into the seed-tubes E E E, which pass through iron shoes H H H, cast in the usual manner, and conduct the grain into the furrows made by said shoes, the earth closing over the grain thus sown. One of the wheels is made fast to the axle, so as to cause the axle to rotate with the wheel, for the purpose of communicating motion to the seeding apparatus, the other being loose, as in the usual manner of hanging wheels. On one end of said axle I arrange a cogged wheel, J, which meshes into a spur-wheel, *e*, (shown by dotted lines in Fig. 3,) and which said spur-wheel has its bearings on the longitudinal pieces of the frame. To this spur-wheel *e* is attached a long crank, *f*, (shown by dotted lines in Fig. 2,) on which crank a pitman, *g*, is so attached as to move freely from one end of the said crank to the other for the purpose of adjusting the feed of the machine, as will be hereinafter described.

On the rear side of the seed-box is a double bolt, *h*, which slides in two clips, *i i*, and is held sufficiently tight by the clips, so as to be moved only by a slight stroke with a hammer. Framed into this double bolt is a perpendicular arm, *k*, slotted in the lower end, so as to come astride of the pitman *g* before described. The pitman *g* has cut on its lower side a gain or open mortise, which, when the machine is in operation, rests over the arm *m* and causes said arm to vibrate with the motion of said pitman. The arm *m* is let into an upright rock-shaft, *n*, (by a mortise and tenon,) which has its bearings in boxes attached to the frame of the machine, as shown at *o o*, and in the same upright shaft, *n*, is an arm, *p*, Fig. 1, and also shown by dotted lines in Fig. 2, which is set at right angles with the arm *m*, and is secured by means of an oblong slot, *q*, to the head of a pin which passes through the bottom of the seed-box, and is secured to the slotted bar F in the inside of the seed-box, for the purpose of giving motion to said bar F. As the pitman *g* is operated by the long crank *f*, it vibrates the arm *m*, and by means of the rock-shaft, into which it is framed, communicates a vibratory motion to the slotted bar F by means of the arm *p* and pin by which they are attached, and thus forces out the grain from the receivers before described in regular quantities into the seed-tubes, and thence into the openings in the ground made by the point of the shoe H, as before described. Extending across the longitudinal timbers of the frame of the machine in its rear is a bar, K, having its bearings upon journals resting in said timbers, to which said bar K the shoes H are attached by means of strap L, which straps are attached by rings to the shoe, and by a pin or hook to the bar K. On one end of the bar K is a lever, M, which, when the machine is in operation hangs down, as shown by the black lines in Fig. 3, and when thrown out of gear is raised up and secured by a catch, *r*, projecting from the seed-box, as shown by red lines in the same figure. By turning the bar K upon its journals by means of the said lever M, it raises the shoes up out of the ground, and at the same time lifts the pitman *g* off from the arm *m* and stops the seeding apparatus, as is fully shown by the red lines in Fig. 3. The feed motion is changed by driving the double bolt *h* backward or forward, which carries the pitman *g* with it, and by means of the long crank *f* before described, and upon which the pitman travels, changes the motion of the arm *m*, and consequently the motion of the slotted bar F, which forces the seed out of the seed-receiver, as before described. When the pitman is moved at the rear end, the opposite end also moves on the long crank, and preserves its parallelism at all times, and making a regular and continuous motion.

The shoes H, &c., are attached to the machine by means of the straps L before described, on the rear, which allows them to enter the ground the proper distance to open the furrow for the seed, and by arms N in front, which are attached to said shoes by two pins, and extend to the front of the frame, where said arms are hinged. Of the two pins which secure the arms N to the shoes, the upper is of iron and the lower one of wood, so that when the shoe strikes against any unyielding substance the wooden pin will break and the shoe swing back on the iron pin, which prevents it from falling out of place and saves the parts from being otherwise injured. The shoe is easily swung back in place and another wooden pin inserted, of which a supply is always carried in the machine.

Having thus fully described my invention, what I claim therein as new, and desire to secure by Letters Patent, is—

1. In combination with the slotted sliding seed-bar F, the stationary lugs *b b* on the plate D, and the concave *c c* on the cap G G, the whole being arranged and constructed as herein described.

2. The combination and arrangement of the double bolt *h*, with its slotted arm *k*, rock-shaft *n*, with its arms *m* and *p*, and pitman *g*, for the double purpose of giving motion to the feeding apparatus and also regulating the quantity of seed to be sown, when said pitman is operated by a long crank, upon which it travels, as herein fully shown and represented.

MARSHALL J. HUNT.

Witnesses:

EDWIN HAINES,

JOB HAINES.